MULTICHANNEL TAPE SYSTEM OF STORAGE

Filed Aug. 11, 1954 6 Sheets-Sheet 1

INVENTOR
John R. Sorrells
BY
Arthur Vinograd
ATTORNEY

INVENTOR
John R. Sorrells
BY Arthur Vinograd
ATTORNEY

SPROCKET CHAN. AMP. 201

INVENTOR
John R. Sorrells
BY Arthur Vinograd
ATTORNEY

Dec. 17, 1957 J. R. SORRELLS 2,817,073

MULTICHANNEL TAPE SYSTEM OF STORAGE

Filed Aug. 11, 1954 6 Sheets-Sheet 4

INVENTOR

John R. Sorrells

BY

Arthur Vinograd

ATTORNEY

Dec. 17, 1957 J. R. SORRELLS 2,817,073
MULTICHANNEL TAPE SYSTEM OF STORAGE
Filed Aug. 11, 1954 6 Sheets-Sheet 5

INVENTOR
John R. Sorrells
BY
Arthur Vinograd
ATTORNEY

1417 + 1419 = STOP
1418 + 1419 = FORWARD
1420 + 1417 = REVERSE

INVENTOR
John R. Sorrells
BY Arthur Vinograd
ATTORNEY

United States Patent Office 2,817,073

Patented Dec. 17, 1957

2,817,073

MULTICHANNEL TAPE SYSTEM OF STORAGE

John R. Sorrells, Hyattsville, Md., assignor to the United States of America as represented by the Secretary of Commerce Application August 11, 1954, Serial No. 449,286

14 Claims. (Cl. 340—174)

This invention relates to a memory or information-storage device such as is commonly employed with large-scale automatic computers where it is desired to store coded information so that it may be withdrawn when needed and rewritten, or altered as necessary. The information stored in such a memory may represent either instructions for further computation or numbers to be operated on, but in either case the information is usually stored as a series of coded binary digits.

The system contemplated in this disclosure is one which uses multichannel magnetic tape as a storage medium together with a system of transducer elements by which access to any desired part of the stored information may readily be obtained, while additional circuits are provided to enable the same transducers to store, or change the nature of the information already stored in the tape.

The present invention employs principles which are commonly known and employed in existing storage systems, such as represented, for example, in the patent to Cohen et al., Serial No. 2,540,654, issued on February 6, 1951. In such systems, in which a magnetic drum is employed as the storing medium, a synchronizing track is employed, which acts as a control for an additional number of collateral tracks on which information signals are stored. The synchronizing track provides a means whereby any particular area on the collateral information-gathering tracks can be picked out with precise accuracy. However, in devices such as that represented in the Cohen patent, which employ a magnetic drum as a storage medium, sufficient physical space is provided by virtue of the size of the cylindrical drum employed, whereby various transducers common to each track can be adequately spaced and staggered with respect to one another so that the danger of cross-talk between adjacent transducers is avoided. In the case of a relatively thin band of magnetic tape which is commercially available in half-inch widths, however, if it is desired to employ a plurality of information-magnetizable tracks together with a synchronizing-channel track parallel to one another along the length of the tape, it is obvious that space limitations necessitate extremely close spacing of the transducer heads in order to cover the track, and considerable interaction or cross-talk between adjacent transducers results. The present invention contemplates the use of a plurality of information channels on a standard narrow magnetic tape in a manner which avoids the deleterious effects consequent to cross-talk and yet permits very close spacing of the transducer heads in order to utilize the maximum surface of the tape.

It is therefore an object of this invention to provide an information-storage system, employing commercially available magnetic tape of relatively narrow width, which enables the use of a plurality of information channels together with a synchronizing channel.

Another object of this information is to provide an information-storage system of the type described which provides a means for readily storing and reading information from the magnetic tape but which eliminates the errors resulting from the presence of cross-talk among the various transducers.

A further object of this invention is to provide a control circuit for a magnetic drive mechanism, which in response to only two applied input direction signals, will exercise three conditions of control of the movement of the tape.

A still further object of this invention is to provide an automatic end stop for the tape drive mechanism which will prevent over-running of the tape as it approaches either end of the reels.

Further objects will become apparent as the description proceeds. A preferred embodiment of the invention is illustrated in the accompanying drawings, in which:

Fig. 1 shows a standard type of magnetic tape-handling mechanism employed with this invention;

Fig. 2*a* is a block diagram of the circuit elements used to store and alter information on the magnetic tape;

Fig. 2*b* is a block diagram of the circuitry involved in sensing or reading information;

Fig. 3 is a schematic circuit diagram showing the details of the sprocket channel amplifier comprising the invention;

Figs. 4*a*–4*d* illustrate the nature and relation of certain signals representing the coded information dealt with;

Figs. 5*a*–5*c* illustrate wave forms explaining the operation of the sprocket-channel amplifier;

Fig. 6 is a curve showing typical characteristics of a germanium diode;

Figs. 7*a*–7*c*, 8*a*–8*c*, 9*a*–9*c*, and 10*a*–10*c* are oscillograms showing characteristic wave forms of the signals at various points on the sprocket-channel amplifier;

Figs. 11*a*–11*c* and 12*a*–12*i* show the character of the signals in another portion of the circuit shown in Fig. 2;

Fig. 13 illustrates the circuitry employed to select the information channels on the tape;

Fig. 14*a* is a circuit diagram showing the improved control circuit for the tape-handling mechanism shown in Fig. 1;

Fig. 14*b* is a chart for consideration in connection with Fig. 14;

Figure 2A:
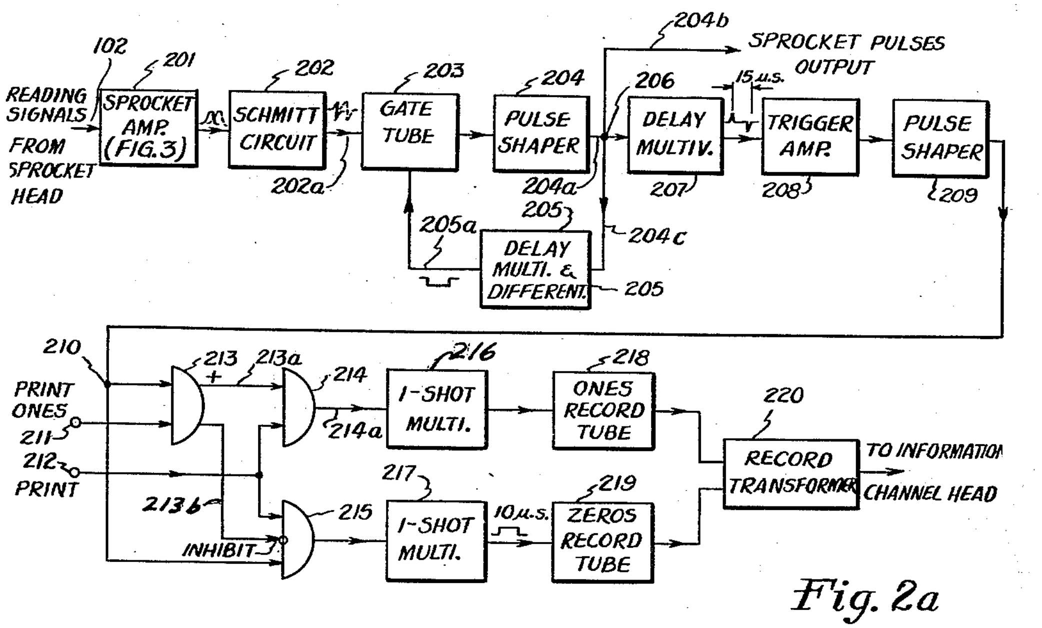
Figure 2B:
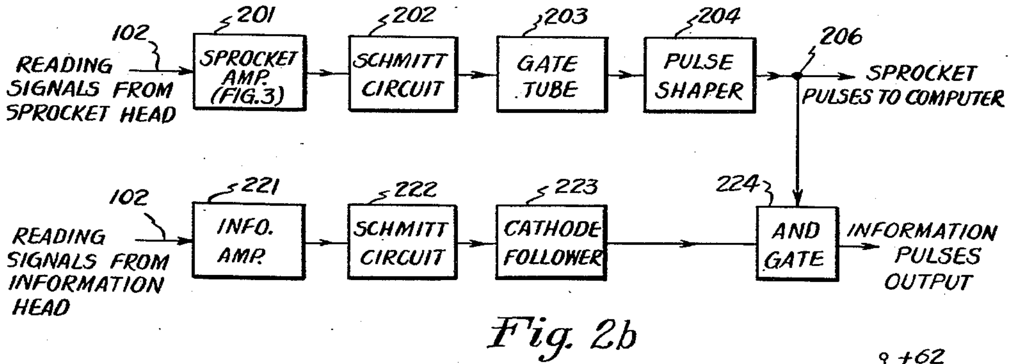

Figs. 17*a*–17*e* diagrammatically illustrate the equivalent circuit construction of various logical elements shown in symbolic form in Figs. 2*a* and 2*b*.

Figure 1:
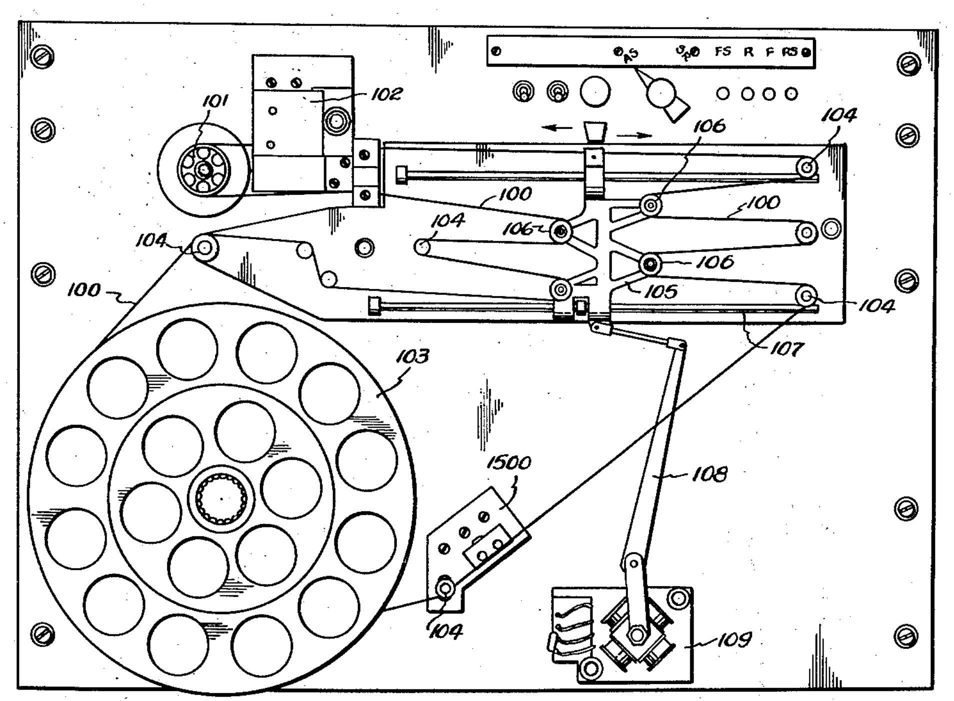

This invention employs a standard commercial magnetic tape-handling system, such as shown in Fig. 1, together with a special circuit for recording and reading information which is illustrated in block diagram form in Figs. 2*a* and 2*b*. The unit preferably employed is a "Computer Magnetic Tape Mechanism" manufactured by the Raytheon Manufacturing Company.

GENERAL FEATURES OF THE SYSTEM

A well-known and widely used system for storing information on magnetic tape is the single-channel type of storage, which is quite simple and requires a minimum of equipment for use. This system requires some provision for interpreting the information received from an external source and supplying the proper signals to the recording head, circuitry for amplifying and interpreting the signals from the reading head, and some means for erasing the tape. The simplicity of single-channel recording is a desirable feature, but such system also has some distinct disadvantages. One objection to this system is that it does not make efficient use of the storage capacity of the tape. If, for instance, a single broad channel is recorded on the tape when it is feasible to record three narrow channels on the same tape, then only a third of the storage capacity of the tape will be utilized. With the existing emphasis on efficiency and compactness, such a waste of recording surface would be difficult to justify, provided a more efficient multichannel system sacrifices nothing in the way of reliability and flexibility.

A further objection to single-channel recording, which also applies to some multichannel systems, is the difficulty, or, in some cases, the impossibility of altering a small specific part of the information on the tape. This trouble results from insufficient control of the erasing and recording processes; specific information cannot be erased and new information recorded in its place without changing adjacent information which is to remain unaltered. In systems where such control is lacking, no attempt is made to selectively alter any information, and as a consequence the system loses some of its flexibility.

Another disadvantage of single-channel and some multichannel storage systems is that the reliability of the system is greatly dependent upon the quality and condition of the tape. Tape flaws due to imperfections in the magnetic surface are a considerable source of errors unless certain precautions are taken. To assure acceptably reliable operation, either the flaws must be removed from the tape or the parts of the tape where flaws occur must be deleted from further use. Although these precautionary measures greatly improve the reliability of the system, they often require an undue amount of tape testing, or result in wasted or inefficiently used tape.

The foregoing disadvantages and limitations of single-channel and some types of multichannel storage are pointed out in order to emphasize the features of the multichannel storage system comprising the present invention and to serve as a basis for its evaluation. In contrast to single-channel systems, the present system makes very efficient use of the tape, is capable of selectively altering as little or as much of the stored information as is desired, requires no erasing of the tape prior to correction, and makes possible the elimination of errors due to tape flaws. These improvements are made possible by using one of the available tape channels as a synchronizing or sprocket channel as in the referred-to Cohen patent, but employing a novel amplification and gating system associated with the closely spaced transducer heads, which makes feasible the use of closely spaced recording channels in connection with relatively narrow recording tape. Before going into further details as to how such objectives are achieved, the method for generally storing information on magnetic tape will be briefly described.

Information is generally stored on the tape in coded binary form, and since the binary system of notation requires only 1's and 0's to represent any given number, use of this system requires any memory cell to be capable of storing or remembering either of two conditions of magnetic polarization in order to store one binary digit. A memory cell is a discrete area measured lengthwise of the tape which may be polarized to a magnetic state distinguishable from an adjacent cell area. A single binary digit appears on the tape then as a small discrete area which is magnetically saturated in either a positive or a negative direction. An area which is magnetized in the positive direction is defined as a binary 1, and an area magnetized in the negative direction is defined as a binary 0. When using a magnetic tape information-storing device in connection with serial type machines, information can be recorded or read from only one channel of the tape at a time. This means that all digits in a "word" or block of information must be stored on a single channel of the tape in a sequential order. Typical wave forms involved in the storage of a sequence of digits are illustrated in Figs. *4a–4d*. The type of magnetic recording system illustrated therein is termed "return-to-zero" recording since the magnetization of the tape always returns to a zero value between successive digits or bits of information as shown in Fig. *4b*, in which the wave form returns to a zero resting level value between occurrences of either a positive or a negative polarizing pulse. Fig. *4a* illustrates the recording current wave form to produce the magnetization of Fig. *4b*, while Fig. *4c* shows the reading voltage obtained by sensing a tape which has been recorded according to Fig. *4b*. Fig. *4d* indicates the digit values represented by the wave forms of Figs. *4a–4c*.

The function of the sprocket channel is to maintain precise control over the recording or reading of each binary digit in any information channel. Precisely time-spaced unidirectional pulses are recorded in the sprocket channel before any information is stored in any of the information channels, and thereafter an information digit is recorded on, or read from, an information channel only coincidentally with detection of a control pulse in the sprocket channel. The pulses on the sprocket channel then, in effect, determine the exact location of each cell in an information channel where a digit may be stored, and unless the pulses in the sprocket channel are purposely altered, the location of each storage cell remains thereby fixed for the life of the tape.

This method of permanently and exactly defining the spot where each and every digit of information is to be stored affords an excellent means of eliminating errors due to tape flaws. Before a tape is put into use, the sprocket channel is recorded from end to end with precisely spaced synchronizing pulses. This channel is then read or sensed and, by suitable circuitry, only a playback pulse above a certain minimum amplitude is selected to cause a pulse to be recorded in the adjacent track or channel. Such channel will then have pulses stored on it at intervals corresponding to only those points on the sprocket channel where there are no flaws, because a sensed signal arising out of a tape flaw will be below such minimum amplitude. The adjacent channel is then sensed, and, directly beside every good playback pulse in the channel, a pulse is recorded on the next channel. The latter channel then will have pulses recorded on it which are directly in line with flawless areas on the sprocket channel and the first referred-to channel. This channel-to-channel transfer continues until all information channels have been inscribed. The synchronizing pulses originally recorded in the sprocket channel are then erased, and a final transfer is made from the last information channel to the sprocket channel. The result of such procedure is to establish a sprocket channel containing prerecorded synchronizing pulses which are in line with only the good areas of all the parallel information channels, and during subsequent operation all tape flaws are automatically "dodged."

Use of a sprocket channel to fix the location of each information pulse or digit also makes it possible to selectively alter any amount of information desired and thereby eliminate the necessity of any erasing. Suppose that a binary 1 has been stored at a given storage position, as determined by the sprocket channel. The magnetic surface of the tape at this point is then saturated in a positive direction. Should it then be desired to store a binary 0 in the place of the binary 1, it is necessary then, in effect, to demagnetize the tape at that point and to magnetically saturate that same area in the negative direction by simply superimposing a 0 on the 1. The sprocket pulse can be made to trigger a recording circuit at the precise instant that the small magnetized area representing the 1 is underneath the air gap of the head, and thereby cause the recording head to be pulsed properly to record a 0. If this current pulse is made of equal amplitude and duration but of opposite polarity to the pulse by which the 1 was recorded, it will completely reverse the polarity of magnetization at that point on the tape and leave it saturated in the negative direction. The binary 1 will therefore be replaced by a binary 0, and in the same manner a 0 can be replaced by a 1. Such described method of selective alteration obviates the need of preliminary erasure of a previously stored signal by virtue of the synchronizing control exercised by the sprocket channel.

*The tape-drive mechanism*

The tape-drive mechanism employed with this invention consists of a known type of magnetic-tape-handling mechanism such as is manufactured by the Raytheon Manufacturing Company, Waltham, Massachusetts. Such mechanism is generally illustrated in Fig. 1 and will be briefly described in order to make the disclosure complete.

The mechanism shown in Fig. 1 is designed to handle one-half inch wide plastic recording tape at a speed of 45½ inches per second in either direction, and is furthermore capable of accelerating the tape from stop to full speed in either direction in a period of 5 to 10 milliseconds. As shown in Fig. 1, the tape-drive capstan 101 is driven by a unidirectional constant-speed motor (not shown) through a system of solenoid-controlled dry magnetic clutches and a differential gear assembly. In order to make possible very rapid starts and stops, the capstan, the gear assembly, and the magnetic clutches are designed to have very low inertia and fast response. The immediate structure for producing such desired characteristics does not form part of the present invention and is therefore not described in detail.

To the right of the capstan 101, there is mounted the transducer head assembly 102 consisting of six identical magnetic transducer heads mounted in a common housing. These heads are stacked side by side and in line across the width of the tape. The heads are precisely positioned in the assembly so that the air gaps of all six are aligned to within a few thousandths of an inch of a straight line perpendicular to the tape length and so that the heads are evenly spaced across the width of the tape.

A pair of tape reels 103 are provided, which are mounted concentrically with each other directly below the tape-drive capstan 101. These reels are mounted on concentric shafts, and each is individually driven by a separate motor. The motors are not shown but are mounted on the back of the panel which also houses a servo amplifier for controlling the reel holders. The tape 100 is threaded from one reel to the other in a closed loop arrangement, as shown in Fig. 1, over a series of fixed idler pulleys 104 and a series of travelling idlers 106 mounted on a shiftable carriage 105, which in turn is mounted on a pair of guide rails 107. The shiftable carriage 105 is connected by means of a link 108 to a variable reluctance pick-up 109. The pick-up 109 is in turn connected to a servo amplifier (not shown) mounted beneath the main panel shown in Fig. 1. The specific construction of the magnetic-tape mechanism will not be further described, since such tape mechanism is a part of the identified commercially available tape-handling unit. However, the operation of the tape mechanism may be briefly described since the immediate invention also concerns the selective positioning of selected portions of the tape in order to obtain access to desired information.

In the idling position of the tape mechanism certain of the magnetic clutch coils (1417—1419, Fig. 14) for the capstan 101 are energized in a manner to be described so that the capstan is held stationary, and the servo amplifier connected to the referred-to reel drive motors supplies a sufficient and properly phased current to the motors so that they tend to rotate in opposite directions, their torques being balanced. The tape in this manner is held under constant tension, and it will be apparent by reference to Fig. 1 that the movable carriage 105 rests at the center positon of its path of travel. To positon the tape in a forward direction the the proper clutch coils (1418—1419, Fig. 14) of the capstan 101 are energized to cause forward rotation of the capstan. The construction of the tape mechanism is such that the capstan comes up to speed extremely rapidly and therefore exerts tension on one loop of the tape 100 due to the inertia of the tape reels; that is, the tape reels do not come up to speed immediately, and the reverse of tape which is stored between the reels and the capstan on the referred-to idlers causes the carriage 105 to move in the direction of the greatest force. The movement of the carriage is reflected by a rotation of the link 108 and the variable reluctance pick-up 109. The resulting change in signal from the reluctance pick-up 109 is fed into the referred-to servo amplifier which in turn controls the acceleration and torque of the tape reel motors. In other words, the only connection between the capstan 101 and the tap reels 103 is through this electrical servomechanism, the response of which is so fast that the movable carriage 105 shifts only approximately two inches from its center rest position before the servo mechanism will have sensed the acceleration of the tape by the capstan and brought the reels up to the proper speed. After such condition is reached, the tape 100 will be moving forward at a specified speed, the tape reels will rotate sufficiently fast to supply and gather up the tape at the proper rate for maintaining constant tape tension, and the movable carriage 105, after being displaced the said two inches to the right of its center rest position, will remain in such position.

In a similar manner, to move the tape 100 in a reverse direction the same sequence of events would occur with the exception that the shiftable carriage would be displaced approximately two inches to the left of its center rest position.

The circuit employed to control the information stored and sensed from the magnetic tape 100 is shown in block diagram form in Fig. 2*a*. The over-all operation of such circuit and its relation to the tape mechanism will be briefly described, following which a detailed exposition of the various significant circuits employed will be given.

*Recording circuitry (Fig. 2a)*

As previously described, the head assembly 102 (Fig. 1) contains a plurality of adjacent magnetic heads or transducers, one for each of the information channels (including the sprocket channel) provided on the tape 100. The transducer associated with the sprocket channel will be referred to as the sprocket channel head, and as shown in Fig. 2*a* the output signals obtained from such sprocket channel head are applied to sprocket amplifier 201. The function of the sprocket channel amplifier 201 is to amplify the low level signals received from the sprocket head and to provide signals of sufficient amplitude to operate other circuits. As described, all recordings in any of the information channels on the tape 100 must be done under the control of the sprocket synchronizing channel. It is therefore necessary to sense the synchronizing signals in the sprocket channel with the sprocket channel head at virtually the same instant that another one of the transducer heads 102 is recording information in an adjacent channel which is only a small distance away. Because of the small width of the tape employed, the windings of any two adjacent transducer heads are therefore quite closely coupled when stacked in the head assembly 102 and, despite the shielding between heads, considerable cross-talk is manifested during a recording operation. In other words, the information being recorded in a channel adjacent to the sprocket channel will be reflected as a spurious signal in the sprocket channel head and erroneous results would ensue. The design of the sprocket channel amplifier 201, together with the novel signal gating circuit, is such as to minimize error signals arising out of cross-talk.

Briefly, the synchronizing signals obtained from the sprocket channel are employed to control energization of the recording circuits but at a slightly delayed time interval with respect to the sensing of the synchronizing pulses. Since the cross-talk signals induced in the sprocket channel head are generated by the recording signal employed in recording information in an adjacent information channel, it follows that the cross-talk signal must necessarily occur at a time interval subsequent to the sensing of the synchronizing pulse. Both the desired synchronizing pulses and the unwanted cross-talk signals therefore occur periodically but time displaced with respect to one another, and a suitable gating circuit is employed to block passage of the cross-talk signal to the recording circuit.

*Sprocket channel amplifier 201 (Fig. 3)*

Figure 3:
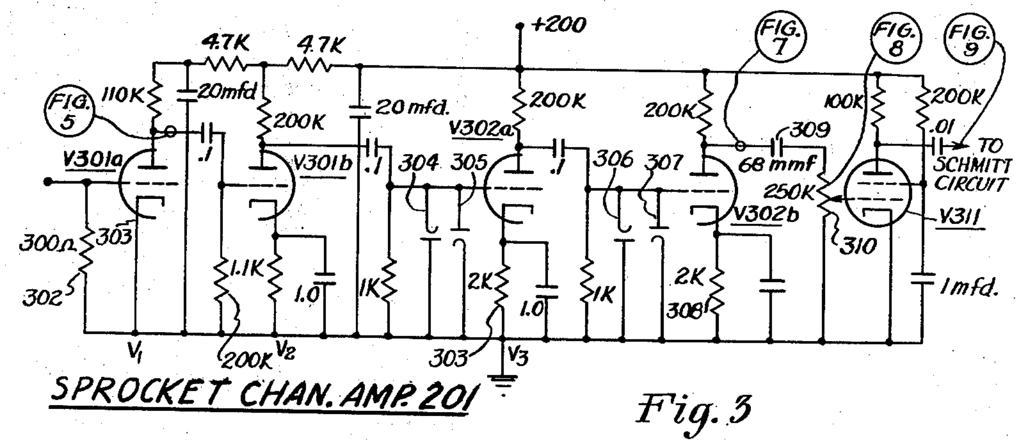

The sprocket-channel amplifier 201, which is detailed in Fig. 3, is specially designed to cooperate with the transducers and the signal gating portions of the circuit shown in Fig. 2*a* to inhibit the effects of cross-talk. For example, it has been determined that when a signal is applied to a transducer which is directly adjacent to the sprocket-channel transducer, the resulting cross-talk measured at the terminals of the sprocket channel transducer head is fifty or sixty times as large as the average reading signal normally obtained when reading the magnetic tape. In actual operation, however, the recording circuit can be constructed so that these two signals do not occur at exactly the same time. That is, since a synchronizing signal obtained from the sprocket channel of the tape is used to initiate the recording of a signal in an information channel, the cross-talk signal thereby induced in the sprocket-channel transducer head can be made to occur a few microseconds after the synchronizing signal from the synchronizing channel has been detected. Advantage is therefore taken in the present invention of such time difference to insure that reading of the sprocket channel signal will occur only during the interval when no cross-talk signal is present and the subsequent occurrence of any cross-talk signal is employed as a gating signal to prevent reading of information by the sprocket channel head when cross-talk is present. In other words, the sprocket-channel amplifier 201 can be designed to ignore the relatively low level synchronizing signals in the information channel during the interval when any cross-talk signal is present and in the absence of any cross-talk signal the amplifier is designed to provide sufficient amplification of the normal low-level information signal, which has been recorded in the sprocket channel, and to recover from any of the referred-to cross-talk signals in time for the next synchronizing signal. A complete circuit for the sprocket channel amplifier 201 is shown in Fig. 3. At various points in Fig. 3 there are indicated the pertinent figures in the drawings which illustrate the wave forms of the signals existing at such points in the amplifier.

Figure 9:
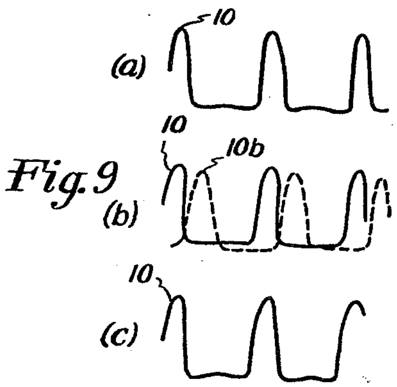

The average amplitude of the signal obtained by reading the synchronizing signal pulses stored in the sprocket channel is approximately 1 millivolt. The undesired cross-talk signal appearing at the input of the amplifier 201 usually amounts to approximately 50 millivolts. In order to amplify the desired 1 millivolt information signal, the first stage of the amplifier 201, detailed in Fig. 3, is designed to have a linear gain of 25. The first stage of the sprocket-channel amplifier comprises the tube V301*a* having a grid returned to ground through a relatively small resistor 302. The cathode 303 is directly connected to ground. Since amplifier tube V301*a* is not self-biased, the occurrence of a large 50-millivolt cross-talk signal will cause grid current to flow during the large positive sweep of such signal, and, characteristically, a certain amount of limiting will therefore occur. In such manner, the sprocket amplifier 201 functions to reduce the amplitude of the spurious signals arising out of cross-talk to a point where such signals will not cause blocking of the amplifier. Referring briefly to Figs. 9*a*—9*c*, a typical signal 10*b*, representing cross-talk, is shown in Fig. 9*b* and is comparable in amplitude to the desired intelligence signal 10 after amplification. The functioning of the amplifier in obtaining such result can be explained by reference to the oscillograms showing the signals at various points in the amplifier.

Figure 5:
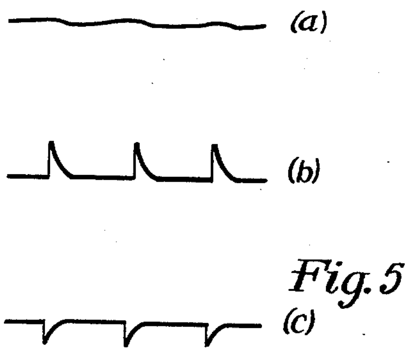

Figs. 5*a*—5*c* represent oscillograms of the actual output signals obtained from the first stage V301*a* of amplifier 201 shown in Fig. 3. Fig. 5*a* represents the normal low-level synchronizing pulse signals as read from the sprocket channel on the tape. Fig. 5*b* illustrates the magnitude and shape of the amplified cross-talk signal induced in the sprocket channel transducer head when binary 1's are recorded in a channel adjacent to the sprocket channel. Fig. 5*c* illustrates the output signal obtained from the sprocket channel amplifier tube V301*a* as a result of cross-talk induced in the sprocket channel head when binary 0's are recorded in a channel adjacent to the sprocket channel. In other words, during normal operation, there may be applied at the input of a second stage V301*b*, of amplifier 201, all three of the signals illustrated in Fig. 5, and it is desired to obtain a response only in respect to the desired synchronizing signals (Fig. 5*a*). The relative amplitudes of the reading and cross-talk signals are apparent by comparing Figs. 5*b* or 5*c* with Fig. 5*a*. The second stage V301*b* of the amplifier is of conventional design, but the third stage 302*c* includes a pair of oppositely connected diodes 304, 305 in the grid circuit, and a cathode resistor 303. Diode 304 will conduct upon the occurrence of an applied signal which is below ground, while diode 305 will conduct upon the application of a signal above ground. The effect of the diodes is to make the maximum effective voltage gain of stage V302*a* less than two in the case of the reading signal for example, and to further cause the stage gain to decrease nonlinearly as the amplitude of the applied signal increase. Such action will be apparent from a consideration of the typical characteristic curves for a germanium crystal type diode illustrated in Fig. 6.

Figures 6, 15, 16:
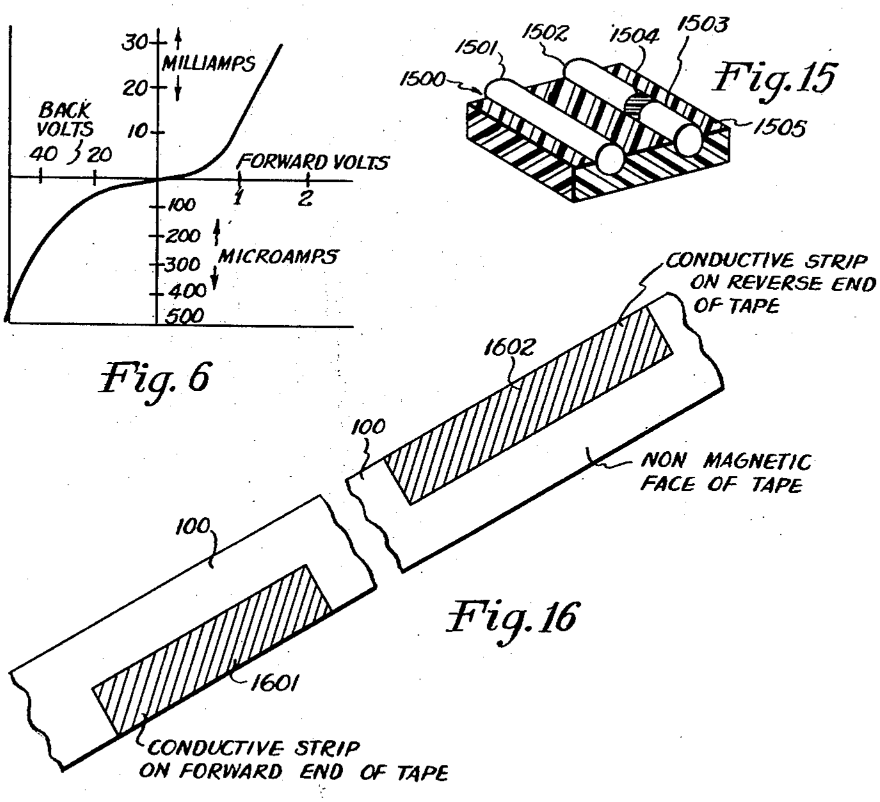
Fig. 15 shows the details of the end-stop senser.
Fig. 16 illustrates a desired modification to the tape.

In accordance with Fig. 6, as the forward voltage across a diode increases, the forward resistance of the diode will decrease in a nonlinear fashion. The diodes 304 and 305, shown in Fig. 3, therefore make the effective load resistance across amplifier tube V301*b* a nonlinear function of the signal amplitude in such a manner that the load resistance decreases as the signal amplitude increases. Since, from Fig. 5, the undesired cross-talk signals (Figs. 5*b*, 5*c*) at this stage in the amplifier are so much greater than the desired synchronizing signal (Fig. 5*a*) such characteristics of the load resistance can be advantageously employed to minimize the effect of the cross-talk signal. At the output of the amplifier stage V301*b* then, the ratio of the cross-talk signal to the reading signal amplitudes will be reduced approximately 5 to 1, and furthermore, no noticeable distortion of the reading signal wave shape will occur. The attainment of an effective reduction in the relative amplitude of the cross-talk signals is paramount to the sacrifice in the amount of amplification of the desired synchronizing signal consequent to such design.

Figure 7:
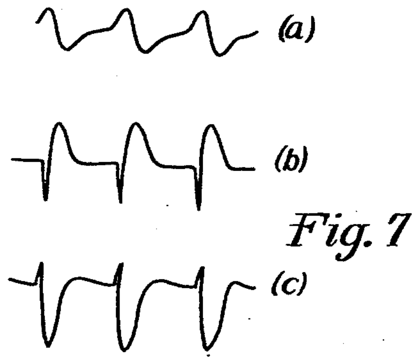

The fourth stage of amplification V302*b*, is also characterized by a nonlinear circuit in the grid comprising the diodes 306, 307. Diodes 306, 307 function in a manner similar to that described in connection with stage V302*a*, so that the gain characteristic of this stage is similar to that of the preceding stage. The effect is such that the output of stage V302*b*, the normal gain of which would be 50 or 60, yields a cross-talk signal which is now reduced to less than twice the amplitude of the desired synchronizing signal and, as a result, the sensed synchronizing signal instead of the cross-talk signal dominates the control action of the amplifier. Fig. 7 shows the wave form of the signals as they exist at the output of V302*b*.

As contrasted with the wave forms shown in Fig. 5 the desired synchronizing signals read from the sprocket channel on the magnetic tape now have the characteristics illustrated in Fig. 7*a*, while the cross-talk signals obtained from the output of V302*b* are illustrated in Figs. 7*b* and 7*c*, corresponding respectively to cross-talk signals occasioned by the recording of binary 1's and binary 0's in an adjacent channel. As a result of such comparison, it is apparent that the effect of the stages of amplifier 201 so far described is to enhance the desired synchronizing signals (Fig. 7a) as compared to the suppressed cross-talk signals (Figs. 7b, 7c), so that the magnitude of the cross-talk signal is less than twice the amplitude of the desired intelligence signal. This is in contrast to the referred-to 50-to-1 ratio originally present at the input to the amplifier. Referring again to Fig. 3, the differentiating circuit comprising the capacitor 309 in the output circuit of amplifier V302b and the resistor 310 in the grid-return circuit of amplifier tube V311 serves primarily to differentiate the signals read from the sprocket channel and to supply essentially unidirectional pulses to the last stage V311 of the amplifier 201. However, the presence of such circuit also serves to differentiate the cross-talk signals (Figs. 7b and 7c) which are also present at this stage.

Figure 8:
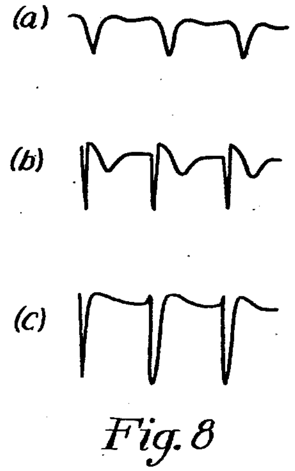

The differentiated signals present at the grid of amplifier stage V311 are illustrated in Figs. 8a–8c, while Figs. 9a–9c show oscillograms obtained from the final stage V311 of the sprocket-channel amplifier. The three oscillograms shown in each of such figures correspond respectively to the desired synchronizing signal and the cross-talk signals induced in the sprocket channel head and the recording of binary 1's and 0's, respectively, in an adjacent channel.

The final amplifier stage V311 consists of a pentode which is operated at zero bias due to the absence of a bias resistor in the cathode circuit. Such stage can therefore amplify only the negative-going portions of the signals shown in Figs. 8a–8c applied at the input grid of V311. The signals obtained from the output of V311 are shown in Figs. 9a–9c. Since the output obtained from stage V311 includes the cross-talk signals, such as the wave form 10b shown in Fig. 9b, the use of a feedback circuit including a delay multivibrator can now be employed to obtain the referred-to desired action and thereby eliminate or inhibit the cross-talk signal.

In order to achieve such gating action, the referred-to output signals, such as in Fig. 9b, are applied to a Schmitt-type trigger circuit 202, which provides a rectangular pulse having a fast rise and fall time for each synchronizing signal received from amplifier 201. Figs. 10a–10c show the character of the output signals obtained from the Schmitt circuit. That is, the signals represented by Figs. 10a, 10b, and 10c represent respectively the output signals (Figs. 9a, 9b, 9c). The Schmitt trigger circuit is of known construction and is described in detail on pages 99–103 of "Electronics Experimental Techniques," by Elmore and Sands, published by McGraw-Hill (1949). The characteristics of such circuit, as clearly described in the referred-to text citation is to deliver an output in response to an applied input signal only when the input signal reaches a predetermined level. The Schmitt circuit is adjusted so that should a wave form of the type illustrated in Fig. 9a be applied, such circuit will be triggered only when the applied signal reaches a level corresponding to approximately 30 percent of its full amplitude for an average signal from the sprocket amplifier. Such selected trigger level is safely above the output noise level of the amplifier and yet allows for variations in the amplitude of the signals obtained from the sprocket amplifier. The square wave output thereby obtained from the Schmitt circuit represents significant signals which are independent of spurious signals arising out of background noise.

Figure 10:
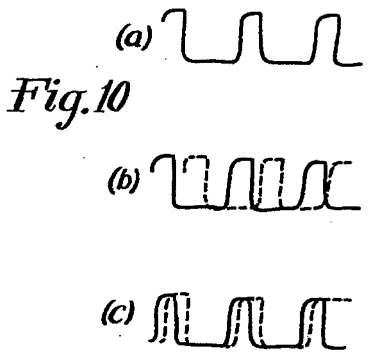
Figure 11:
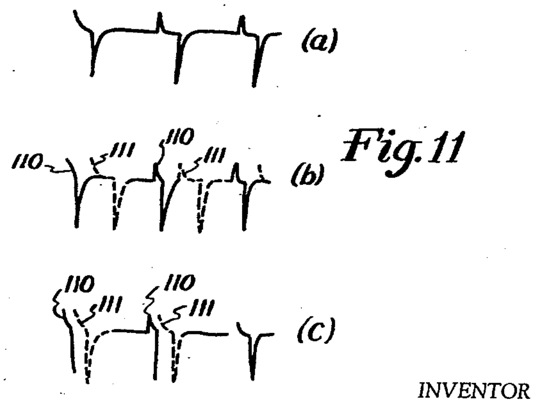

The Schmitt circuit 202 also includes a differentiating circuit and Fig. 11 shows the same pulses discussed in connection with Fig. 10 after such differentiating occurs. The sharp differentiated pulses are employed as triggers which are applied to the control grid of a gating tube 203 (Fig. 2) and the output of gate 203 is applied through pulse shaper 204 to delay multivibrator 205 through lead 204a. When triggered, the pulse shaper 204 provides a positive pulse of approximately 2 microseconds duration. An output line 204b is provided to feed such pulses to the over-all system with which the storage device is used if desired. These pulses are normally employed to synchronize the transfer of information into and out of the tape.

Referring again to Fig. 2a, a delay multivibrator 205 is inserted in a feedback connection 204c, 205a, between the output of pulse shaper 204 and a second input of gate 203. The delay multivibrator 205 may be a conventional cathode-coupled monostable multivibrator adapted to generate timing wave forms in a known manner as described and shown on page 181 of "Waveforms," vol. 19, of the Radiation Laboratory Series published by McGraw-Hill. Conduction of such multivibrator is initiated by a pulse from pulse shaper 204 and applied to the delay multivibrator through conductor 204c. The negative output of the multivibrator is chosen. Since the output signal is a square wave having a fixed amplitude of definite duration, it can be used to block the conduction of gate 203 for a time interval corresponding to the duration of such pulse, as will be apparent.

Figures 17A, 17B, 17C, 17D:
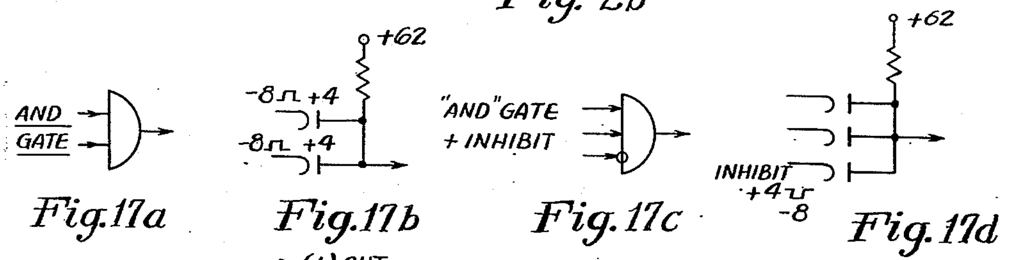
Figure 17E:
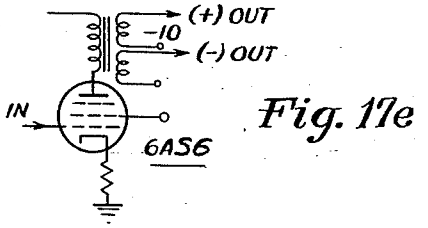

The gate 203 is a conventional 6AS6 type of multigrid tube used as a gating device. The circuit for gate 203 is detailed in Fig. 17e. The output of the Schmitt circuit 202 is applied through lead 202a to the control grid of the gate tube, and the output of delay multivibrator 205 is applied to the suppressor grid through conductor 205a. The gate 203 includes a pulse transformer in the plate circuit as shown in Fig. 17e, so that an output of desired polarity may be obtained from the transformer secondary.

The suppressor grid of the gate tube is normally held at ground potential, and the application of a positive signal or pulse to the control grid will therefore initiate conduction. However, the application of the described negative output square wave pulse from delay multivibrator 205 to the suppressor grid will act to block conduction of the gate for the duration of the square wave pulse. That is, because of the square wave form, the gate is turned off instantly and held off during the 100 microsecond duration of the square timing wave. The purpose of such arrangement will now be described.

At this point in the description it will be clear that signals having the characteristics of either Fig. 11b or 11c, depending on whether a binary 1 or 0 is being recorded in adjacent information channel, will be applied to the control grid of gate tube 203. Wave form 110 corresponds to the desired synchronizing signal, while wave form 111 represents the spurious signal arising out of cross talk.

Since the gate 203 (Fig. 2) is turned off a fraction of a microsecond after it has been triggered to conduction by a signal such as the referred-to pulse 110, and since the gate is further held non-conductive by the referred-to 100 microsecond output pulse from delay multivibrator 205, it is apparent that the unwanted cross-talk signal pulse 111, which occurs a few microseconds subsequent to pulse 110, as will be shown, cannot get through the gate. After the referred-to 100 microsecond interval has elapsed, the gate is again opened to receive the next desired synchronizing pulse from the sprocket channel.

Thus, by providing the described 100-microsecond duration delay timing pulse, which corresponds approximately to the 100-microsecond interval between the prerecorded synchronizing pulses in the sprocket channel for blocking the gating tube between each desired synchronizing pulse, it is easily possible to entirely eliminate the deleterious effects occasioned by the cross-talk signals.

In such described manner there is present at point 206 in the block diagram of Fig. 2a only the desired synchronizing signals obtained by reading the sprocket channel on the tape, the cross-talk signal having been eliminated as a possible triggering source in the described manner. The synchronizing signals are thereafter employed in the remaining portion of the block diagram of Fig. 2a to regulate the recording and reading of information in the information-storing channels on tape 100.

In order to facilitate the separation of the spurious signals arising out of cross-talk due to a recording operation from the desired synchronizing pulses, each synchronizing pulse is given a slight delay before it is applied as a control pulse in the information-recording circuit. By virtue of such delay, which may be of approximately 15-microseconds duration, the recording signal and the cross-talk signal consequent thereto is restricted to occur 15 microseconds after a synchronizing pulse has been sensed. This permits the described method of discrimination between the synchronizing and cross-talk pulse to be effective. To provide such a delay, a second delay multivibrator 207, similar in construction to the multivibrator 205, previously identified, is employed. In this instance, however, the multivibrator is used in a slightly different manner, as shown and described in "Radio Engineering," by F. E. Terman (third edition) on pages 590–591. The application of a sharp triggering pulse, such as is represented by the synchronizing pulse obtained from the output of pulse shaper 204 to the input of multivibrator 207 results in a square wave output, the duration of which is readily determined by the circuit constants as is well known. It will be appreciated that the time interval between the leading and trailing edges of the square wave output can be used as a delay function. Such effect is accomplished by differentiating the square wave output through a suitable resistor-capacitor combination to produce sharp positive and negative pulses corresponding respectively to the leading and trailing edges of the square wave as indicated in Fig. 2*a*. The trigger amplifier 208 is biased to select and amplify only the pulse derived from the trailing edge of the square wave, which pulse is applied through a second pulse shaper 209 to point 210 in Fig. 2*a*. Such pulse represents a 15-microsecond delayed sprocket pulse at point 210, as compared to the sprocket amplifier pulse manifested at point 206. These delayed sprocket pulses perform the function of timing each pulse recorded in an information channel on the tape and are therefore not employed during a reading operation.

The synchronizing pulses obtained at point 210 in Fig. 2*a* are employed to control the recording of information in the channels adjacent to the sprocket channel. The input terminals 211, 212, represent the points of application of the information or instructions to be stored as obtained from the particular over-all device with which the recording mechanism is used.

The manner in which the synchronizing pulses from the sprocket channel cooperate with the applied information signals to control the recording of information through the transducer heads 102 is based on an arrangement of gating circuits whereby coincidence between the delayed synchronizing signals and either of the information signals present at input points 211, 212, will result in the recording of the proper information. Complete control of all recording is achieved by properly gating the "Print" and "Print 1's" signals applied at terminals 212, 211, with the delayed synchronizing pulses from the sprocket channel.

The portion of the circuit shown in Fig. 2*a* from point 210 to the record transformer 220 is involved in recording the two classes of information with which this invention is concerned.

The upper branch comprising the elements 213, 214, 216, and 218 determines the recording of binary 1's, while the lower branch 215, 217, 219 controls the recording of binary 0's.

The terminals 211 and 212 correspond respectively to the point of application of a "print 1" and "print" signal, respectively. Such information signals are obtained from a source, not shown, comprising an element of the overall system with which the present device may be employed; for example, the National Bureau of Standards Eastern Automatic Computer (SEAC), significant portions of which are described in an article entitled "SEAC" by Greenwald et al., Proc. IRE, vol. 41, October 1953, pp. 1300–1313, and which is in public use. When it is desired to record an output information signal with such type of device, a positive direct-current print signal will be supplied to terminal 212 from the over-all device. In addition, if the information to be stored is a binary 1, another significant positive signal will be applied at input terminal 211. A binary 0 will be manifested by the absence of any such significant signal.

If a print or storing instruction signal appears at terminal 212, it will be simultaneously applied to both And-gate 214 and the And-inhibit gate 215. These gates are of known construction and are shown in Figs. 17*a*, 17*b* and 17*c*, 17*d*, respectively. As is well known, an And-gate (Figs. 17*a*, 17*b*) will deliver an output signal only upon concurrence of a plurality of applied input signals and in the absence of a negative inhibit signal. The presence of a negative inhibit signal (Figs. 17*c*, 17*d*) blocks the gate. The construction and operation of such logical circuits as fully described in an article entitled. "Dynamic circuit techniques used in SEAC and DYSEAC" by Elbourn and Witt appearing in the Proceedings of the I. R. E., volume 40, No. 10, October 1953, pages 1380–1383.

Assuming then that a printing instruction signal has been delivered to terminal 212, the subsequent application of either "print 1's" or the absence of such signal at input terminal 211 will ultimately determine energization of either the upper branch (213, 214, etc.) or the lower branch (215, 217, etc.) in Fig. 2*a*.

Specifically, the application of a print-1's information signal to terminal 211 concurrently with the arrival of a delayed synchronizing pulse from pulse shaper 209 will cause And-gate 213 to produce both a positive and negative output signal on leads **213*a* and 213*b*, respectively. The application of the negative output pulse through lead 213*b* will immediately inhibit or cut off And-inhibit gate 215** which thereby prevents subsequent energization of the lower branch portion of the circuit.

In the absence of a print-1's information signal, no output will be obtained from And-gate 213, and hence gate 215 will not be inhibited. Therefore the application of a synchronizing pulse from point 210 in time with a print instruction signal from 212 will produce an output from And-inhibit gate 215 and cause energization of the one-shot multivibrator 217, the 0's record amplifier 219 and record transformers 220, which will inscribe a spot of negative polarity on the tape 100.

Returning to the condition in which a print-1's signal is applied at terminal 211, upon concurrence of a synchronizing signal at timed intervals from pulse shaper 209, with a print-1's signal there will be produced positive and negative outputs from And-gate 213. The negative output obtained from gate 213 will cut off And-inhibit gate 215, while the positive output will be applied through lead **213*a* to a second And-gate 214. Concurrence of such positive output signal with the referred-to print instruction signal obtained from terminal 212 will energize gate 214 to produce an output which is applied through lead 214*a* to the input of one-shot multivibrator 216. Vibrators 216 and 217 are of identical construction and are of a known type such as is described on pages 590–591 of Terman's "Radio Engineering," third edition. In response to such triggering, multivibrator 216 will produce a square wave output pulse of 10 microseconds duration which energizes the 1's-record driver amplifier 218 and record-transformer 220** to produce a positive magnetizing spot on the tape.

It is apparent therefore that the time-spaced synchronizing pulses obtained from the sprocket channed amplifier 201 determine the energization of both the 1's and 0's recording channel so that recording of either type of information can occur only in synchronization with such timing pulses. Selection of either a 1's or 0's recording channel is determined by the nature of the information signal applied at terminal 211.

*Summary of operation (recording circuitry)*

Assuming that the synchronizing pulses have been prerecorded in the sprocket channel at precise 100-microsecond intervals, then the sprocket channel amplifier 201 will provide such synchronizing pulses at point 206 in Fig. 2*a*. The delay circuit 207 then provides a 15-microsecond delay to each such signal before it is applied to point 210. Since such delayed synchronizing pulse determines energization of either the 1's recording circuit or the 0's recording circuit by controlling the gates 213, 215, all recording of information must be initiated at a time interval subsequent to that in which a synchronizing pulse has been sensed. It is apparent therefore that any cross-talk signal induced in the sprocket channel head arising out of a recording operation in an adjacent information channel must correspondingly occur at a 15-microsecond interval subsequent to the desired synchronizing signal as described in connection with Figs. 9–11. Since the desired synchronizing pulses and the unwanted cross-talk signals each occur at 100-microsecond periodic intervals, but time-displaced with one another, the gating tube 203 together with the delay multivibrator, function to block passage of the unwanted cross-talk signal by properly synchronizing the gating action of tube 203 with the synchronizing pulses in the described manner.

*Reading circuitry (Fig. 2b)*

The amount of circuitry involved in a reading operation is considerably less than that required for recording, since most of the critical timing is necessary only during recording. Reading consists simply of detecting the signals stored on an information channel, determining whether each information signal represents a 1 or a 0, and transferring such information to a desired utilization device as a sequence of synchronous pulses. Fig. 2*b* is a block diagram of the circuitry which performs these functions.

The information channel amplifier 221, to which the transducer heads 102 for the information storage channels are connected, is a conventional class A amplifier consisting of four triode stages and having an over-all voltage gain of 100,000. The output signals from the amplifier are approximately 100 volts in amplitude and drive a Schmitt circuit 222 which is triggered only by the positive half cycle of each signal from the amplifier and provides a 30-microsecond rectangular pulse output. The construction of the Schmitt circuit 22 is similar to that described in connection with the description of component 202 shown in Fig. 2*a*. The output pulse passes through an impedance-matching cathode follower 223, and is applied to one input of an And-gate 224 which is the same type as identified in Fig. 17*a*. The undelayed pulses from the sprocket channel as obtained from pulse shaper 204 are applied to the other input of the And-gate 224. During a reading operation these pulses are derived from the sprocket channel exactly as they are during recording, and even though there is no cross-talk signal to disturb the circuits during reading, the timing of a given synchronizing pulse from the sprocket channel is the same for both operations.

Figure 12:
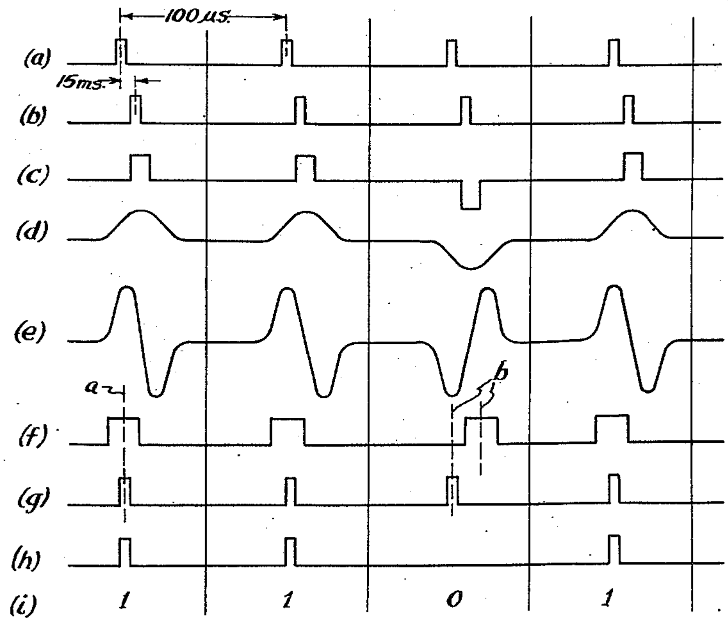

Fig. 12 is a timing chart showing the relationship among the signals existing at various points in the circuit under consideration, as follows:

Fig. 12*a* shows the synchronizing pulses as they exist in the sprocket channel;

Fig. 12*b* shows the delayed synchronizing pulses as they exist at point 210 in Fig. 2*a*.

Fig. 12*c* illustrates the recording current employed for recording a binary 1 or a binary 0 as indicated by Fig. 12*a*.

Fig. 12*d* illustrates the flux distribution on an information channel due to the recording currents shown in Fig. 12*c*;

Fig. 12*e* shows the playback wave form obtained as a result of reading either a binary 1 or a binary 0 from an information channel the nature of the digit being told in Fig. 12*i*;

Fig. 12*f* indicates the output obtained from the reading channel Schmitt circuit 222 corresponding to the wave form of Fig. 12*e*;

Fig. 12*g* is a repetition of the synchronizing pulses shown in Fig. 12*a* showing the relation of such pulses with the Schmitt circuit output during a reading operation;

Fig. 12*h* shows the output obtained from gate 224 during a reading operation.

Fig. 12*i* shows the nature of the binary digits related to the above wave forms.

The And-gate 224 combines each information signal read from an information channel (Fig. 12*e*) with its associated synchronizing pulse Fig. 12*a* thereby determining whether the sensed information signal represents a 1 or a 0, as will be clear by reference to the timing diagram in Fig. 12. From Fig. 12*e* it can be seen that the playback signal obtained by sensing a binary 1 has an initial positive swing which is followed by a negative swing whereas a signal having opposite characteristics is obtained in reading a 0 (compare the first and third wave forms in Fig. 12*e*). The value of an information digit is easily determined, therefore, merely by sensing whether the first half cycle of the playback signal (Fig. 12*e*) is positive or negative. Accordingly, the playback signals (Fig. 12*e*) from the information channel amplifier 221, when applied to Schmitt circuit 222, will be discriminated in a manner so as to provide only a positive output during each positive swing as shown in Fig. 12*f*. These signals from the Schmitt circuit are then compared with the synchronizing pulses **12*a* or 12*g* by the And-gate 224**. If the sensed digit is a 1, the Schmitt circuit signal and the sprocket pulse will coincide as indicated by broken line "*a*" in Fig. 12, resulting in a pulse output from gate 224. If the information digit is a 0, the sprocket pulse and the Schmitt signal will arrive at the gate at different times, and there is no coincidence as shown by lines *b*—*b* in Fig. 12, and hence no output is obtained from gate 224. During a reading operation, a pulse output from the gate at a given sprocket pulse time therefore indicates a 1, and no pulse from the gate at a given sprocket pulse time indicates a 0.

At this point it should be clear why it is necessary during recording to delay the sprocket pulses in element 207, Fig. 2*a*, before they trigger the record circuits. If the sprocket pulses were not delayed during recording, then timewise, the magnetic flux (Fig. 12*d*) representing the information digit would be centered with respect to the sprocket pulse (Fig. 12*a*) and, during reading, the sprocket pulse would not therefore coincide with the first half cycle of the information signal but would occur at the time when the information signal is crossing the base line. Such operation would be marginal, of course, and very unreliable. Delaying the sprocket pulses which trigger the record circuits overcomes such difficulty. The 15-microsecond delay during recording shifts the information digits just enough with respect to the sprocket pulses so that on playback a sprocket pulse always occurs during the first half cycle of each information signal, and reliable coincidence is assured.

*Miscellaneous associated circuitry*

Figure 13:
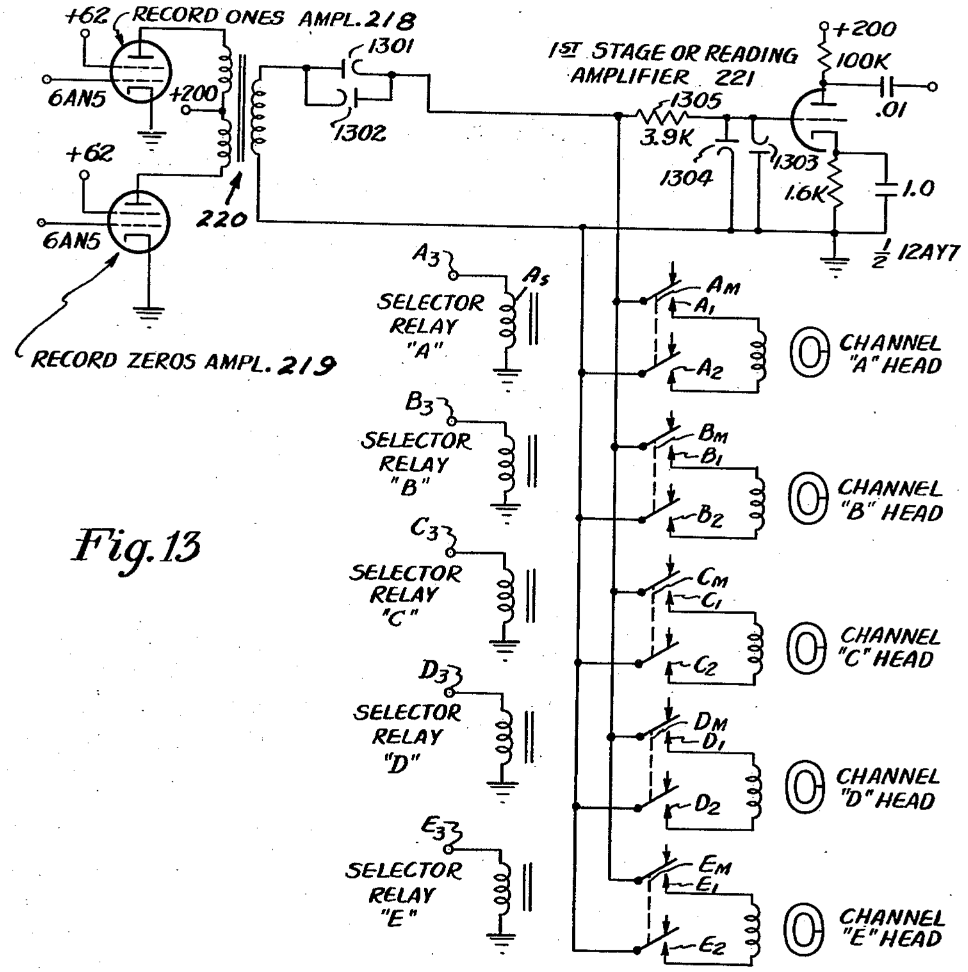
Figure 4:
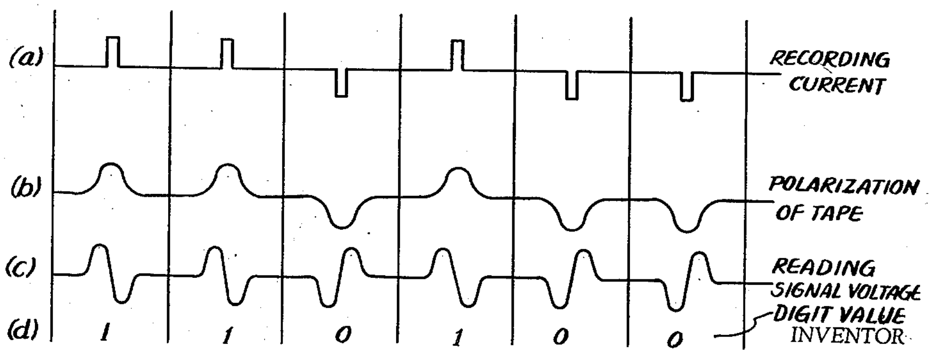

In addition to the main circuitry involved in the recording and reading of information other circuitry is necessary to perform such associated functions as switching information channel heads and controlling the tape transport mechanism. In systems where the same head is used for both the recording and reading of information, the usual procedure is to switch the connections to the head so that during reading the head is connected only to the input of the reading amplifier and during recording it is connected only to the recording circuits. The purpose of such switching is to isolate the reading amplifier input from the recording circuits so that there is no interaction between the two. In order to eliminate the necessity of such separate switching operation, the circuit shown in Fig. 13 is employed. This circuit makes it possible to leave the recording circuits and the reading amplifier permanently connected to each other, so that it is necessary only to connect the transducer head of the selected channel to a pair of common terminals to read or record.

In Fig. 13 the 1's and 0's record amplifiers 218 and 219, identified in connection with the description of Fig. 2*a* are shown in circuit with the previously referred-to record-transformer 220. The transformer secondary is connected to the reading amplifier 221 previously identified in connection with Fig. 2*b* through a circuit including a plurality of germanium type diodes 1301—1304. The transducer heads for each of the plurality of channels on the tape are designated as A, B, C, D, and E, respectively, in Fig. 13, and the energizing coil for each head is permanently connected to respective pairs of contacts, $A_1$—$A_2$, $B_1$—$B_2$ etc., as shown.

A selector relay including a solenoid such as $A_s$ and a double armature such as $A_m$ is provided for each of the heads, the armatures being adapted to complete a circuit between the contact pairs $A_1$—$A_2$, etc., and the referred-to circuit between the record and read amplifiers 218, 219, and 221, as shown in Fig. 13. To select a given information channel for operation a positive D.-C. voltage is applied to the terminal anode as $A_3$ of a channel-selector relay, and the armature (such as $A_m$) will then complete a circuit between the selector channel ahead and the reading and recording circuit as shown in Fig. 13.

The four germanium diodes 1301–1304, shown in the circuit of Fig. 13, permit automatic coupling between the transducer heads and either the record or read amplifier. The magnitude of the two signals involved in recording and reading differ greatly, and the nonlinearity of the diodes is used to advantage. By using the circuit shown in Fig. 13 it has been empirically determined that for a 10-microsecond 35-milliampere recording pulse through the head the total equivalent resistance of the two diodes 1301, 1302, in series with the head is 130 ohms, the inductive reactance of the head is approximately 3,300 ohms, and the equivalent resistance of the two grid-return diodes is 120 ohms. Thus, the head is shunted by approximately 4,000 ohms and has 130 ohms in series with it, and the current source during a recording operation. The voltage drop across the series diodes is negligible, but approximately 45 percent of the pulse current available from the transformer 220 will pass through the 3.9K resistor 1305 and the diodes 1303, 1304, in shunt with the head. While this current is wasted, the tubes which drive the transformer are capable of supplying three to four times the pulse current needed for recording and the loss is easily tolerated. When current flows through the shunt path, the 3.9K resistor 1305 and the two grid-return diodes 1303, 1304, act as a voltage divider, and since the diodes have an equivalent resistance of only 120 ohms, most of the drop in potential appears across the resistor. Actually only three percent of the recording voltage applied to the head appears at the grid of the reading amplifier tube, and this is small enough to be tolerated by the reading amplifier.

During a reading operation, the playback signals obtained from the head are approximately one millivolt in magnitude and consequently all four diodes 1301–1304 in the circuit have a much higher equivalent resistance. The resistance of the series diodes 1301, 1302, plus the high impedance of the secondary of transformer 220, is extremely high during reading, so that the voltage divides across resistor 1305 and the grid-return diodes 1303, 1304. It is obvious that the signal applied to the grid of the tube would be too small unless the equivalent resistance of the diodes at least approaches 3.9K. Actually, this equivalent resistance is approximately 6.7K so that the voltage division is in the desired direction and at least two-thirds of the playback signal is applied to the grid of the reading amplifier 221. Therefore the circuit successfully provides electronic switching for both reading and recording and mechanical switching of heads is necessary only when a different tape channel is selected.

*Control of tape drive*

The described means for electronically controlling the storing of information on the tape 100 requires that the tape be transported and positioned with a precision commensurate with that provided by the signal control means.

The commercial tape mechanism described in connection with Fig. 1 includes an internal control circuit designed to be normally controlled by three timed trigger pulses provided by an external source corresponding respectively, to tape forward, tape reverse, and tape stop. The original control circuit included amplifiers which controlled the firing of a plurality of thyratrons connected to the clutch coils of the capstan described in connection with Fig. 1.

The present invention includes a necessary modification to such control circuitry which permits operation of the tape mechanism under the control of only two instead of three control signals as provided for in the instrument as supplied. The purpose of such modification is to adapt the tape mechanism for use with an over-all system of the type described in the referred-to IRE publication which provides only two control signals for the magnetic tape storage system: tape forward and tape reverse (but no tape-stop signal). The modified circuit is completely detailed in Fig. 14. Such circuit is designed to exercise all three conditions of control over the tape drive in respone to only two applied control signals.

Referring to Fig. 14 the connections for applying the referred-to tape forward and tape reverse signals as obtained from the over-all mechanism are identified as terminals 1406 and 1407. The ganged manually settable switches have a plurality of selection contacts corresponding to C (outside control), S (stop position), F (forward) and R (reverse drive). Such symbolization is self-explanatory. With switch 1408 positioned at position C, the tape mechanism will be automatically controlled by signals applied to terminals 1406, 1407, from the over-all mechanism with which the tape mechanism is used. Contacts S, F, or R are selected in the event it is desired to manually control the tape mechanism for stopping, forward advance, or reverse movement, respectively.

Figures 14A, 14B:
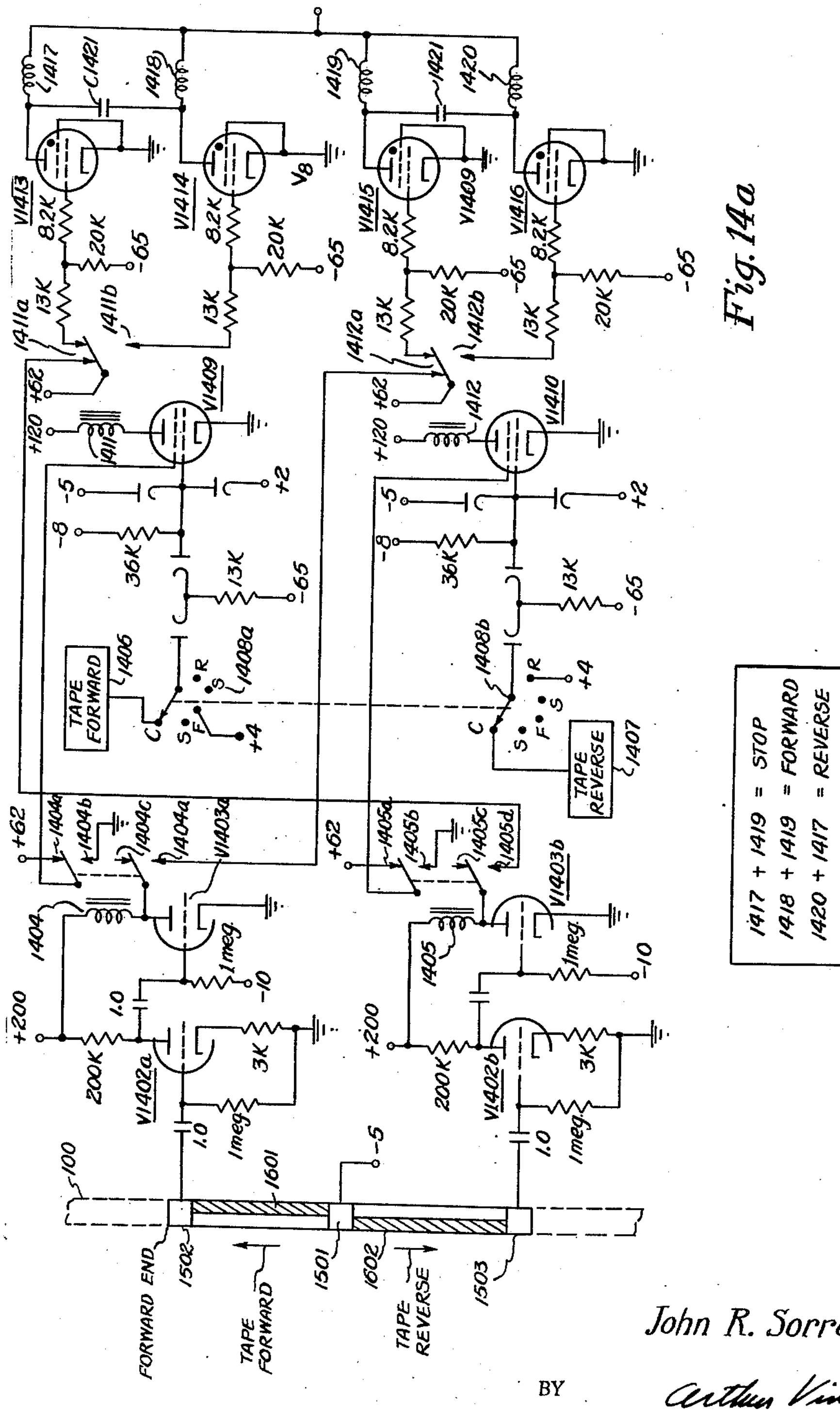

The coils designated 1417, 1418, 1419, and 1420 in Fig. 14*a* represent the referred-to clutch control coils for determining the movement of the capstan drive 101. Energization of coils 1417 and 1419 holds the capstan stopped; energization of coils 1418 and 1419 produces forward rotation of the capstan drive, and when coils 1420 and 1417 are energized the capstan will run in a reverse direction. Such information is tabulated on the chart of Fig. 14*b* for reference purposes.

*Tape stopped*

Selective energization of the coils 1417—1420 in the required combinations is determined by the firing of the thyratrons V1413, V1414, V1415, and V1416, associated with each of the coils. The normal positions of the armatures associated with each of the relays 1411 and 1412 are shown in Fig. 14*a* as completing a circuit across contacts **1411*a* and 1412*a*, respectively, thereby applying a positive potential of 62 volts to the control grids of the thyratrons V1413 and V1415. The resulting energization of coils 1417, 1419**, corresponds to a stopped condition of the capstan drive as shown in the chart of Fig. 14*b*. The relays 1411 and 1412 are in the plate circuits of tubes V1409, V1410.

With the switches **1408*a* and 1408*b* set as shown for automatic control (C) of the tape mechanism drive, a tape forward signal will be automatically applied to the grid of V1409 and a tape reverse signal to the grid of V1410, should such control signals be present at terminals 1406 and 1407. Because of the illustrated diode arrangement in the grid circuits, these tubes are normally biased to cut-off. The second grids of each of the tubes V1409, V1410, are connected respectively to an armature of a pair of relays 1404, 1405, each forming the plate load of amplifier tubes V1403a and V1403b. The normal position of the armatures for relays 1404, 1405**, are as shown in Fig. 14*a* and a positive potential of 62 volts is therefore normally present in the screen grids of tubes V1409 and V1410.

The presence of a positive tape forward signal at terminal 1406 will therefore cause V1409 to conduct and throw the armature of relay 1411 to a position opening the circuit across contacts 1411a and applying a positive voltage through contact 1411b to the control grid of tube V1414. Such action will cause V1414 to conduct and the resulting initial negative pulse will be transmitted through coupling capacitor C1421 to cut-off tube V1413. Since thyratron V1415 has remained in a conductive state, relay 1412 not having been energized as a result of the above action, clutch coils 1418 and 1419 are now in an energized state, a combination which, according to the chart in Fig. 14*b*, results in a forward drive of the capstan.

*Tape reverse drive*

Similarly should a tape reverse signal be present at terminal 1407, the action of the armature of relay 1412 and contact 1412b will be such as to fire thyratron V1416, cut-off thyratron V1415, and energize coil 1420. Under such conditions no tape forward signal will be present at terminal 1406, and hence the armature of relay 1411 will remain in the position shown in Fig. 14*a* and coil 1417 will remain energized. As indicated by the chart of Fig. 14*b*, energization of both coils 1420 and 1417 indicates a reverse drive of the capstan.

In the described manner the tape drive is completely controlled by only the two tape forward and tape reverse signals obtained from the over-all apparatus as long as switch 1408 is in the C position. In the other positions the switch 1408 controls the same circuit elements in a like manner to manually control movement of the tape.

The remaining circuitry shown in Fig. 14*a*, including the tubes V1402, B1403, and relays 1404 and 1405, provides automatic end stopping of the tape to prevent inadvertent separation of the tape from either reel due to overrunning in either direction.

*End-stop senser*

An auxiliary sensing device 1500 is mounted on the tape mechanism shown in Fig. 1 adjacent to the concentric reels and in contact with the non-magnetic side of the tape. The construction of the end-stop senser is detailed in Fig. 15 and comprises a base plate 1505, made of insulating material on which a plurality of conductive contacts 1501, 1502, and 1503 are mounted. The contacts 1502 and 1503 are insulated one from the other by an insulating collar 1504. As shown in Fig. 16, a mark 1601 made with conductive silver paint is applied on the nonmagnetic face of tape 100 across approximately one half of the tape width and a corresponding conductive mark is painted on the same face of the tape at a point adjacent to the other end of the tape and occupying the opposite width of the tape, as is clearly indicated in Fig. 16.

The sensing head 1500 is mounted so that the tape 100 runs in physical contact with all three of the conductive contacts 1501–1503, and the width of the head corresponds to the tape width. The physical arrangement of the conductive marks 1601, 1602, and the spacing of the three contacts 1501–1503, permits each of the conductive strips 1601 and 1602, respectively, to bridge separate pairs of the contacts 1501–1503. That is, the disposition of strip 1601 with relation to the width of the tape is such as to bridge contacts 1501 and 1502, while strip 1602 can bridge contact 1501 and contact 1503. In other words, the respective pairs of contacts which have been bridged in such manner determine the presence of either end of the tape.

The contacts 1502 and 1503 are also shown in Fig. 14*a* as being connected to the input of amplifiers V1402a and V1402b, respectively. The common contact 1501 is connected to a negative voltage source as shown. The ends of the tape 100 are also symbolically illustrated in Fig. 14*a* as is also the bridged position of the conductive strips 1601, 1602. It is evident that when one end of the tape 100 has been reached, the strip 1601 will bridge contacts 1501–1502 and contact 1502 will deliver a negative pulse to the grid of V1402a. Similarly, when the other end of the tape is reached, conductive strip 1602 will bridge contacts 1501 and 1503 to apply a negative signal to the grid of V1402b.

Should the sensing mark 1601 operate contact 1502, as is the case where the tape is travelling in a forward direction (i. e., coils 1418, 1419 energized, relay 1411 energized and relay 1412 deenergized) a positive pulse will cause driver tube V1403a to conduct and energize relay 1404 which is in the plate circuit of V1403a. The double armature of relay 1404 is shown in its normal position in Fig. 14*a*, and when thrown by the resulting energization of relay 1404 one armature will close a hold circuit established by contact 1404d. Contact 1404b serves to ground the screen grid of tube V1409, which is otherwise normally at a positive potential and tube V1409 is thereby cut off even though a positive tape forward pulse should then be present on its control grid. Since relay 1411 is thereby deenergized, its armature will resume the normal position shown in Fig. 14*a*, which results on conduction of tube V1413 and energization of capstan coil 1417. Since, according to the chart of Fig. 14*b*, during the forward motion of the tape, coils 1418 and 1419 were energized, the referred-to positioning of the armature 1411 will now have cut off V1414, deenergizing coil 1418. Therefore, since coils 1417 and 1419 are now energized the capstan drive and the tape will be stopped, as is evident from Fig. 14*b*.

Forward movement of the tape is therefore automatically halted when the forward end of the tape has been reached.

The end-stop senser functions in a similar manner to stop the tape drive when the tape is moving in the reverse direction and approaches the end of the reel. When the tape is running in a reverse direction, clutch coils 1420, 1417, are energized, as shown by the chart of Fig. 14*b*. In such condition relay 1411 will be in its normal deenergized position and relay 1412 will be energized. When the tape approaches the end of the reel, mark 1602 (Fig. 14*a*) will bridge contacts 1501 and 1503 to initiate a positive pulse in relay 1405. The double armature of such relay will be thrown from the position shown in Fig. 14*a* to a position contacting relay contacts 1405b, 1405d.

Tube V1410 will therefore be cut off and the consequent deenergization of the relay 1412 in the plate circuit will shift the armature relay back to the normal position shown in Fig. 14*a*. Tube V1416 will thereby be cut off and coil 1420 deenergized, while tube V1415 will conduct and energize coil 1419. The tape drive will now be stopped because of the concurrent energization of coils 1414 and 1419 (see Fig. 14*b*).

When the end-stop senser 1500 has functioned in the described manner to halt the tape after it has been run through in a forward direction, it will be noted that any tape-forward signal is absolutely blocked due to the consequent grounding of the screen grid of tube V1409 through contact 1404b by the described action initiated by contact 1502. The path of the tape-reverse signal, however, is kept open to enable reversing the tape drive. Since the holding circuit for forward end-stop relay 1404, comprising contact 1404d is in the circuit with normally closed contacts 1412a of relay 1412, a subsequent tape reversal is necessary in order to energize relay 1412 and interrupt such holding circuit.

Similarly, if the end-stop senser 1500 has functioned as described to halt the tape after it has been unreeled in a reverse direction, a tape-reverse signal will be ineffectual due to the grounding of the screen of tube 1410 through contact 1405b by the described action initiated by end-stop contact 1503. In this case, the path for the tape-forward signal is kept open to enable subsequent reversal of the tape drive in a forward direction. The holding circuit for reverse end-stop relay 1405 comprises contact 1405d, which is in series with normally closed contacts 1411a of relay 1411, and a subsequent reversal of the tape drive in a forward direction is required in order to energize relay 1411 and interrupt such holding circuit.

It will be apparent that the provision of a plurality of parallel information channels on the tape enables the storing of independent unrelated information in each of the channels. Since the stored information cannot be read back in reverse, to obtain access to desired stored information the tape must be reversely driven to the beginning of the stored area on the tape. If such stored information were needed repeatedly, valuable time would be expended in reversing the tape after each reference.

In order to overcome such deficiency, the present invention contemplates the recording of information in opposite directions for alternate channels. Preferably, every odd channel is employed for storing and reading information with the tape running in a forward direction, while each interposed even channel is utilized for storing and reading information with the tape moving in a reverse direction.

In this manner, in order to expedite information access time, selected information is divided up and stored in two adjacent channels. The first half of the data is stored, for example, in an odd channel, the tape moving in a forward direction. At the end of such storing operation, the remainder of the information is stored in the adjacent even channel, the tape moving in a reverse direction. Since storage is always under control of the sprocket or synchronizing channel, the stored information is, in effect, inscribed in a folded loop on the tape so that at the end of all subsequent reference to the data, the tape is always back at the beginning and data is ready to be read again.

While a particular embodiment has been disclosed as required by the patent statutes, the invention is not necessarily so limited, since the features of instruction and formula of operation are susceptible of various modes of application, limited only to the extent outlined in the appended claims.

What is claimed is:

1. In a multichannel magnetic data-storage system of the type employing a sprocket channel having prerecorded precisely time-spaced synchronizing pulses and a plurality of adjacent data-storage channels, reading means associated with said sprocket channel for detecting said synchronizing pulses, means including delay means associated with said data-storage channels and controlled by said detecting means for recording data in said data-storage channels periodically with respect to said synchronizing pulses and at time periods delayed with respect to each synchronizing pulse, means for blocking cross-talk signals induced in said sprocket channel reading means by said recording means at time periods subsequent to the appearance of said synchronizing signals comprising coincidence circuit means to which said synchronizing and cross-talk signals are applied, said cross-talk signals being applied relative to said synchronizing signals in a time sequence corresponding to said delayed time periods, and means connected to said coincidence circuit and responsive to said synchronizing pulse detecting means for applying a blocking signal in timed sequence with each of said synchronizing pulses and having a duration equal to the period between said synchronizing pulse and a like repetition rate.

2. A structure according to claim 1 in which said sprocket channel detecting means comprises an amplifier the gain of which decreases nonlinearly and inversely with respect to the amplitude of the signals applied thereto.

3. A structure according to claim 1 in which said blocking signal applying means comprises a multivibrator connected between the output and a second input of said coincidence circuit.

4. A structure according to claim 1 in which said recording means comprises a signal delay circuit connected to the output of said coincidence means, second coincidence circuit means connected to said delay circuit, means for applying recording instruction signals to said second coincidence circuit, and means energized by the output of said second coincidence circuit upon coincidence of said delayed synchronizing pulse and said applied information signals.

5. A structure in accordance with claim 1 in which said recording means comprises a signal delay circuit connected to the output of said coincidence means, a first energizable circuit for recording information of one type, a second energizable circuit for recording information of a second type, first and second coincidence gates connected to each of said energizable circuits, a third coincidence gate having outputs of opposite polarity connected to each of said first and second coincidence gates, means connecting said delay circuit to said third coincidence gate and means for applying separate instructional signals to said third gate and concurrently to said first and second gates, respectively.

6. In a multichannel magnetic data-storage system of the type employing a sprocket channel having prerecorded precisely time-spaced synchronizing pulses and a plurality of adjacent data-storage channels, reading means associated with said sprocket channel for detecting said synchronizing pulses, means for recording data in said data-storage channels, means controlled by said detecting means for periodically energizing said recording means at time intervals subsequent to the detection of each synchronizing pulse, means for blocking cross-talk signals induced in said sprocket channel reading means by said recording means comprising a coincidence gate connected to said sprocket channel reading means and means connected to said coincidence gate for applying a blocking signal in synchronism with each of said synchronizing pulses and having a duration equal to the period between said synchronizing pulses.

7. The structure defined in claim 6 in which said means controlled by said detecting means includes a delay circuit for delaying each of the detected synchronizing pulses and means for applying the delayed synchronizing pulses to said recording means.

8. In a multichannel data-storage system of the type employing a movable magnetic recording surface defining a master sprocket channel having prerecorded precisely time-spaced synchronizing pulses and a plurality of adjacent closely spaced information data-storage channels arranged parallel to said master channel, a transducer head for each channel, said transducer heads being arranged in a line transverse to the direction of motion of said recording surface and in close proximity to one another to delineate channels whose lateral boundaries are substantially contiguous with one another, means for detecting the synchronizing pulses on said sprocket channel, recording circuit means connected to said data-storage channel transducer heads, means controlled by said detecting means for periodically energizing said recording means at time intervals subsequent to the detection of each synchronizing pulse, means for blocking cross-talk signals induced in said sprocket channel detecting means by said recording means comprising a coincidence gate connected to said detecting means for applying a blocking signal in synchronism with each of said synchronizing pulses and having a duration equal to the period between said synchronizing pulses.

9. The method of controlling the recording of information in a magnetic data-storage system of the type employing a sprocket channel having prerecorded precisely time-spaced synchronizing pulses and a plurality of adjacent data-storage channels and recording means therefor closely spaced with respect to each other and to the sprocket channel comprising the steps of detecting the occurrence of a synchronizing pulse, time delaying each of said synchronizing pulses, controlling the energization of said data-storage channel recording means by said delayed synchronizing pulses, and filtering out the reflected cross-talk signal induced by energization of said recording means.

10. In a multichannel magnetic data-storage system of the type employing a sprocket channel having prerecorded precisely time-spaced synchronizing pulses and a plurality of adjacent data-storage channels closely spaced with respect to each other and to the sprocket channel, signal sensing means associated with said sprocket channel for detecting said synchronizing pulses, means for recording data on said adjacent data-storage channels, means for delaying said detected synchronizing pulses to control the energization of said recording means, means for blocking cross-talk signals induced in said sprocket-channel sensing means by said recording means comprising a pulse time sensitive detector having a time constant corresponding to the repetition period of said undelayed synchronizing pulses.

11. In a multichannel magnetic data-storage system of the type employing a sprocket channel having prerecorded precisely time-spaced synchronizing pulses and a plurality of adjacent data-storage channels and recording means therefor, reading means associated with said sprocket channel for detecting said synchronizing pulses, said reading means comprising an amplifier having at least two stages of amplification, voltage limiting means connected to the output of said first stage and to the input of said second stage for attenuating the output of said first stage, whereby the maximum effective over-all voltage gain of the amplifier is less than 2 and decreases nonlinearly with increases in amplitude of the signal applied to the first stage.

12. A structure in accordance with claim 11 in which said voltage-limiting means comprises a plurality of diodes connected between the output of said first stage and the input of said second stage, said diodes being inversely connected with respect to each other.

13. In a multichannel magnetic data-storage system of the type employing a magnetic recording surface having a plurality of adjacent data-storage channels and a transducer head individual to each channel, a first data-recording circuit electrically coupled to each head for energizing said head during a recording operation, a second reading circuit electrically connected to said recording circuit and to each of said heads, the electrical connection between said recording circuit and said heads including a series-connected nonlinear device forming a high impedance path to said recording circuit, the electrical connection between said reading circuit and said heads including a nonlinear device connected in parallel to form a low impedance across the reading circuit whereby the generation of a recording signal from the recording circuit will effectively shunt the reading circuit, and the generation of a reading signal by said heads will be effectively blocked by said series nonlinear device.

14. A circuit construction in accordance with that defined in claim 13 in which each of said nonlinear devices comprises a pair of diodes inversely connected with respect to each other.

References Cited in the file of this patent

UNITED STATES PATENTS

| | | |
|---|---|---|
| 2,335,277 | Heller | Nov. 30, 1943 |
| 2,553,410 | Hanshin | May 15, 1951 |
| 2,579,071 | Hansell | Dec. 18, 1951 |
| 2,625,611 | Roberts | Jan. 13, 1953 |
| 2,633,564 | Fleming | Mar. 31, 1953 |
| 2,685,682 | Sepahban | Aug. 3, 1954 |
| 2,700,148 | McGuigan | Jan. 18, 1955 |